United States Patent Office 3,654,213
Patented Apr. 4, 1972

3,654,213
ALIPHATIC HYDROCARBON-COMPATIBLE
PRESSURE-SENSITIVE ADHESIVE
Roger M. Christenson and Carl C. Anderson, Gibsonia, Pa., assignors to National Starch and Chemical Corporation, New York, N.Y.
No Drawing. Filed May 27, 1968, Ser. No. 732,088
Int. Cl. C08f 37/04, 45/28
U.S. Cl. 260—33.6 UA
10 Claims

ABSTRACT OF THE DISCLOSURE

Normally tacky pressure-sensitive adhesives based on interpolymers of vinyl esters and alkyl acrylates and which are compatible with liquid aliphatic hydrocarbon solvents such as hexane, are provided by including as at least a portion of the vinyl ester component a vinyl ester of a tertiary alkanoic acid, the vinyl ester having 10 to 13 carbon atoms. Preferred interpolymers also contain a vinyl ester of a non-tertiary alkanoic acid and a small amount of interpolymerized ethylenically unsaturated carboxylic acid. These interpolymers can be dissolved at high solids content in organic solvents which contain a substantial proportion of liquid aliphatic hydrocarbon.

BACKGROUND OF THE INVENTION

Normally tacky adhesives which are adherent upon application of light finger pressure and which can be removed from the surfaces to which they are applied are known as pressure-sensitive adhesives. These can be based upon a wide variety of interpolymer compositions; the more useful of these include acrylic acid esters as one major component. One class of such acrylic pressure-sensitive adhesive interpolymers also contains a substantial amount of interpolymerized vinyl esters such as vinyl acetate. Adhesive interpolymers of this type are described, for example, in U.S. Pat. 3,355,412.

In common with many adhesive compositions, such pressure-sensitive adhesives are desirably produced and applied from organic solvent solution; the solution is applied to a substrate and upon evaporation of the solvent, a tacky, pressure-sensitive adhesive film is obtained. Because of their availability, low cost and relatively high volatility, organic solvents containing a large proportion of liquid aliphatic hydrocarbons, such as hexane, provide a highly desirable solvent medium for such adhesives. However, interpolymers containing acrylic acid esters and substantial amounts of vinyl esters, as described above, are in most cases insufficiently compatible with liquid aliphatic hydrocarbons to permit the preparation and use of such interpolymers in organic solvents containing large amounts of such aliphatic hydrocarbons. This deficiency has, therefore, limited the utilization of interpolymers of this class and has necessitated the use with such interpolymers of higher cost and less desirable solvents.

BRIEF SUMMARY OF THE INVENTION

The present invention is based upon the discovery that the use of certain vinyl esters of a tertiary alkanoic acid as at least a portion of the vinyl ester component of an alkyl acrylate-vinyl ester adhesive interpolymer, provides interpolymers which are highly compatible with liquid aliphatic hydrocarbons. Such interpolymers can be dissolved at high non-volatile solids content, for example, 35 percent or higher, in a solvent medium containing relatively large proportions of liquid aliphatic hydrocarbon. Such solvent media include, for example, solvent mixtures in which the liquid aliphatic hydrocarbon content is 40 percent by weight or higher; in many cases, the solvent can be composed entirely of one or more aliphatic hydrocarbons.

DETAILED DESCRIPTION OF THE INVENTION

The interpolymers of the present invention comprise from about 5 percent to about 85 percent by weight, based on the total interpolymer, of at least one vinyl ester of a tertiary alkanoic acid and from about 15 percent to about 95 percent by weight of one or more alkyl acrylates having from 4 to 12 carbon atoms in the alkyl group. For best overall adhesive properties, the proportion of vinyl ester of a tertiary alkyl acid should be within range of 5 to 20 percent of the total interpolymer, and the interpolymer should contain at least about 30 percent by weight of one or more other vinyl esters, usually vinyl esters of a non-tertiary alkanoic acid of 4 to 6 carbon atoms. It will be understood that the components and the proportions are chosen so as to provide interpolymers which are normally tacky, i.e., which form a dried film which is tacky at normal conditions and room temperature.

The vinyl ester of a tertiary alkanoic acid contains from about 10 to about 13 carbon atoms, and is an ester of the formula (1) 

where R is a tertiary alkyl group of from about 7 to about 10 carbon atoms. Such esters are commercially available, generally as mixtures of compounds of the formula (2) 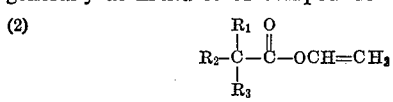

where $R_1$, $R_2$ and $R_3$ are each alkyl groups which may be the same or different and which contain a total average number of from 6 to 9 carbon atoms. The preferred vinyl ester of this type contains a total of 8 carbon atoms in the alkyl groups represented by $R_1$, $R_2$ and $R_3$.

The alkyl acrylate component of the interpolymer is composed of one or more alkyl acrylates having 4 to 14 carbon atoms in the alkyl group, i.e. acrylic acid esters formed from alcohols of 4 to 14 carbon atoms. Examples of such alkyl acrylates include butyl acrylate, amyl acrylate, 2-ethylhexyl acrylate, decyl acrylate, octyl acrylate, lauryl acrylate, tridecyl acrylate, and the like.

In the preferred interpolymers in which a lower vinyl ester is included, the other vinyl ester component is essentially any copolymerizable vinyl ester of a saturated carboxylic acid. Such other vinyl esters generally correspond to Formula 1 above where R is a non-tertiary alkyl group of 1 to 5 carbon atoms; such esters include, for example, vinyl acetate, vinyl propionate, vinyl butyrate and vinyl valerate. Vinyl acetate is by far the most widely used vinyl ester of this type and is a specific preferred ester for use in this invention. Vinyl esters of higher saturated aliphatic carboxylic acids, for example, vinyl laurate, can also be employed in some cases but are not usually desirable and, in addition, may not always be subject to the problem to which the present invention is primarily directed. However, such higher vinyl esters can be utilized, if desired, to provide certain properties.

Other monomers can be optionally included in the interpolymer in addition to those specified. It is often quite desirable that the interpolymer contain a small amount of interpolymerized ethylenically unsaturated carboxylic acid, and in most cases such an acid is included in the adhesive interpolymers of the invention. The presence of an acid among the monomers improves the strength and adhesive qualities of the resulting interpolymer and provides an adhesive polymer of higher plasticity number. The preferred acids for inclusion in the interpolymer are acrylic acid and methacrylic acid, since these are most easily interpolymerized, but other monocarboxylic and dicarboxylic acids can also be used. Examples include maleic acid, fumaric acid, methyl hydrogen fumarate, ethyl hydrogen maleate, butyl hydrogen maleate, and the like. When an acid is included in the interpolymer, it is ordinarily present in an amount of from about 0.5 percent to about 15 percent by weight of the total interpolymer.

Other monomers which can be included in the interpolymer if desired include various methacrylic acid esters and acrylic acid esters other than those described. For example, there can be utilized such monomers as methyl acrylate, ethyl acrylate, propyl acrylate, methyl methacrylate, butyl methacrylate, hexyl methacrylate, lauryl methacrylate, and similar compounds. Still other monomers that can be utilized in some instances are vinyl aromatic hydrocarbons, such as styrene and vinyl toluene; substituted acrylic monomers, such as cyanoethyl acrylate and methacrylate, acrylamide, methacrylamide, acrylonitrile, methacrylonitrile, N-methylol acrylamide, N-butoxymethyl acrylamide, 2-hydroxyethyl acrylate, 2-hydroxypropyl methacrylate, allyl alcohol, and aminoethyl methacrylate; halogenated olefinic compounds, such as vinyl chloride and vinylidene chloride; other unsaturated esters, such as isopropenyl acetate and dimethyl maleate; and dienes, such as 1,3-butadiene.

It will be recognized that in choosing any such other monomers which are to be included, one must consider the specific properties ordinarily imparted by such monomers, which may or may not be desirable in any particular adhesive interpolymer, and whether such monomers will copolymerize with the other monomers present. Monomers containing reactive functional groups, for example, would ordinarily only be used in very small amounts, if at all, since otherwise the normally tacky characteristics of the desired interpolymers may be lost. Similar considerations apply with respect to many of the other monomers mentioned.

The adhesive is essentially composed of an interpolymer as described above or a mixture of polymers which provides an average composition as described. As indicated, these interpolymers are quite compatible with liquid aliphatic hydrocarbons. The specific preferred hydrocarbon of this type is n-hexane, but others, such as n-pentane, 2-methylpentane, 2,3-dimethylbutane, n-heptane, 2-methylhexane and n-octane, are also useful. Mixtures of such hydrocarbons can also be used. The solvent medium may be made up entirely of the liquid aliphatic hydrocarbon or hydrocarbons, but in many cases other solvents are included in the solvent mixture. Such other solvents may be, for instance, cycloaliphatic hydrocarbons, such as cyclopentane and cyclohexane; esters, such as ethyl acetate, isopropyl acetate, ethyl propionate and the like; alcohols, such as methanol, ethanol, propanol, butanol, etc.; or ketones, such as acetone, methyl ethyl ketone, methyl isobutyl ketone, and the like. The proportion of liquid aliphatic hydrocarbon in the overall solvent mixture is usually at least about 40 percent by weight.

There can also be included in the adhesive composition additive materials which do not effect the basic properties of the adhesive. Fillers, tackifiers, antioxidants, stabilizers and the like are sometimes added to the formulated adhesive.

The adhesives herein are applicable to various substrates and backing members; they can be used as free films or they can be employed to make a pressure-sensitive adhesive sheet or tape. They can be easily stored or transported while in solution, without precipitation of the adhesive, and applied and dried to form the desired adhesive layer.

In addition to their compatibility with aliphatic solvents as described, the adhesives herein also have highly desirable adhesive properties commensurate with good pressure-sensitive adhesives of this general class as known heretofore. In some cases improved properties over many known adhesives are provided.

The adhesive polymers herein are produced using essentially conventional techniques. The monomers are combined in a single charge or are added incrementally, depending upon the particular monomers, catalyst etc. The reaction is ordinarily carried out in an organic solvent, which may or may not be comprised of a substantial proportion of liquid aliphatic hydrocarbon, and in the presence of a free-radical initiator, such as benzoyl peroxide, cumene hydroperoxide or other peroxide, or an azo compound such as azobis(isobutyronitrile). The product can be diluted with aliphatic hydrocarbon solvent during or after the reaction is completed.

The invention will be described further in connection with several illustrative examples. The examples are not to be construed as limiting the invention to their details, and in the examples as well as throughout the specification all parts and percentages are by weight and are based upon non-volatile solids content, unless otherwise indicated.

Example 1

In this example, a preferred adhesive polymer of the class described is produced; the composition of the polymer is as follows:

| | Percent |
|---|---|
| 2-ethylhexyl acrylate | 50 |
| Vinyl acetate | 39.5 |
| "VV-10 Vinyl Monomer" [1] | 10 |
| Acrylic acid | 0.5 |

[1] Commercial designation for mixed vinyl esters of tertiary alkanoic acid corresponding to Formula 2 above, where $R_1$, $R_2$ and $R_3$ are alkyl groups having a total average number of 8 carbon atoms.

In producing the polymer, the following mixture was charged

| | Parts by weight |
|---|---|
| 2-ethylhexyl acrylate | 30.0 |
| Vinyl acetate | 23.2 |
| "VV-10 Vinyl Monomer" | 6.0 |
| Acrylic acid | 0.4 |
| Benzoyl peroxide | 0.4 |
| Ethyl acetate | 24.0 |

This mixture was refluxed for 15 minutes, and then while maintaining refluxing the following mixture was added over a 1½ hour period:

| | Parts by weight |
|---|---|
| 2-ethylhexyl acrylate | 50.0 |
| Vinyl acetate | 40.0 |
| "VV-10 Vinyl Monomer" | 10.0 |
| Acrylic acid | 0.4 |
| Benzoyl peroxide | 0.4 |
| Ethyl acetate | 24.0 |

Refluxing was continued while adding 80 parts of n-hexane over a 2½ hour period. One hour later, and while still refluxing, a mixture of 24 parts of ethyl acetate and 0.4 part of benzoyl peroxide was added over a 2 hour period. After refluxing 2 more hours, 80 parts of hexane and 20 parts of anhydrous ethanol were added and the mixture cooled. The product was a slightly hazy solution having a non-volatile solids content of 38 percent in a solvent mixture of 63.5 percent hexane, 28.5 percent ethyl acetate and 8 percent ethanol. The viscosity of the product was about 7000 centipoises and the standard Williams plasticity number of the polymer was 2.30 mm. It also had excellent tack and peel strength as measured by standard tests.

By way of comparison, a polymer made in a similar manner but replacing the "VV-10 Vinyl Monomer" with proportional amounts of 2-ethylhexyl acrylate and vinyl acetate, is very milky and precipitates when the concentration of hexane is as low as 40 percent.

Example 2

Example 1 was repeated, using in place of the "VV-10 Vinyl Monomer" an equivalent amount of "VV-9 Vinyl Monomer," which is a commercially available mixture of vinyl esters corresponding to Formula 2 above where $R_1$, $R_2$ and $R_3$ are alkyl groups having a total average number of 7 carbon atoms. The product solution obtained was clear, and the adhesive polymer had satisfactory properties although somewhat harder and less tacky than the product of Example 1.

Example 3

In this example, the polymer is produced in a solvent composed entirely of liquid aliphatic hydrocarbons, the polymer having the following composition:

|  | Percent |
|---|---|
| Vinyl acetate | 20 |
| "VV–10 Vinyl Monomer" | 60 |
| 2-ethylhexyl acrylate | 15 |
| Acrylic acid | 5 |

Two monomer solutions were employed in producing the polymer, as follows:

|  | Parts by weight | |
|---|---|---|
|  | A | B |
| 2-ethylhexyl acrylate | 30 | 60 |
| Vinyl acetate | 40 | 80 |
| "VV–10 Vinyl Monomer" | 120 | 240 |
| Acrylic acid | 10 | 10 |
| n-Hexane | 30 | 30 |
| n-Heptane | 60 | 60 |
| Benzoyl peroxide | 1.5 | 1.5 |

Solution A was heated to reflux and, while refluxing, Solution B was added over a one hour period. Refluxing was continued for 6½ more hours; during the third hour a solution of 2 parts of benzoyl peroxide in 90 parts of heptane was slowly added. At the end of the reaction period 400 parts of heptane were added. The product has a non-volatile solids content of 48.6 percent; the solution was substantially clear with only slight cloudiness. The polymer had a plasticity number of 2.47 and had good adhesive properties.

Example 4

Following the procedure of Example 3, an adhesive polymer was produced in a solvent mixture of n-hexane and n-heptane. The polymer had the following composition:

|  | Percent |
|---|---|
| 2-ethylhexyl acrylate | 50 |
| "VV–10 Vinyl Monomer" | 47 |
| Acrylic acid | 3 |

The product had a non-volatile solids content of 45 percent and was a clear solution. The adhesive polymer was very tacky and had good adhesive properties, including high peel strength.

Example 5

Following the procedure of the above examples an adhesive polymer was produced having the following composition:

|  | Percent |
|---|---|
| 2-ethylhexyl acrylate | 15 |
| "VV–10 Vinyl Monomer" | 82 |
| Acrylic acid | 3 |

The product formed a clear solution at 45 percent solids content in a solvent composed of 100 percent n-heptane. The polymer was soft and tacky but provided a useful adhesive for certain purposes.

Example 6

Example 1 was repeated using n-butyl acrylate in place of 2-ethylhexyl acrylate. A product of similar properties was obtained.

Example 7

Following the procedure of the above examples, an adhesive polymer was produced from the following:

|  | Percent |
|---|---|
| 2-ethylhexyl acrylate | 40 |
| Vinyl acetate | 29.5 |
| "VV–9 Vinyl Monomer" | 30 |
| Acrylic acid | 0.5 |

The product solution in aliphatic solvent was clear; the adhesive had useful properties.

Similar results to those described are obtained utilizing other vinyl esters, acrylic acid esters and solvents, as disclosed above, in place of those of the examples. It has been found that in all cases interpolymers of acrylates with vinyl esters of tertiary alkanoic acids provide substantially clearer solution in aliphatic solvents as compared to corresponding interpolymers containing non-tertiary alkanoic acid esters such as vinyl acetate made in the same manner. Intermediate solubility characteristics in such solvents result from varying mixtures of these monomers.

According to the provisions of the patent statutes, there are described above the invention and what are now considered to be its best embodiments. However, within the scope of the appended claims, it is to be understood that the invention can be practiced otherwise than as specifically described.

We claim:

1. A liquid adhesive composition which dries to a pressure-sensitive film, said composition comprising
   (A) an organic solvent medium containing at least about 40 percent by weight of liquid aliphatic hydrocarbon, and
   (B) dissolved in said solvent medium a normally tacky interpolymer of
      (1) from about 5 percent to about 85 percent by weight of at least one vinyl ester of a tertiary alkanoic acid, said vinyl ester containing from about 10 to about 13 carbon atoms, and
      (2) from about 15 percent to about 95 percent by weight of 1 or more alkyl acrylates having 4 to 14 carbons in the alkyl group.

2. The composition of claim 1 in which the interpolymer contains at least about 30 percent by weight of a copolymerizable vinyl ester of a non-tertiary alkanoic acid.

3. The composition of claim 2 in which said copolymerizable vinyl ester is a vinyl ester of a non-tertiary alkanoic acid of 2 to 6 carbon atoms.

4. The composition of claim 3 in which said vinyl ester is vinyl acetate.

5. The composition of claim 1 in which the interpolymer contains from about 0.5 percent to about 15 percent by weight of interpolymerized ethylenically unsaturated carboxylic acid.

6. The composition of claim 1 in which said vinyl ester of a tertiary alkanoic acid is a mixture of compounds of the formula

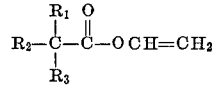

where $R_1$, $R_2$ and $R_3$ are alkyl groups having a total average number of about 7 to 8 carbon atoms.

7. A liquid adhesive composition which dries to a pressure-sensitive adhesive film, said composition comprising
   (A) an organic solvent medium containing at least about 40 percent by weight of liquid aliphatic hydrocarbon and
   (B) dissolved in said solvent medium, a normally tacky interpolymer of
      (1) from about 5 percent to about 20 percent by weight of at least one vinyl ester of a tertiary alkanoic acid, said vinyl ester containing from about 10 to about 13 carbon atoms, (2) at least about 30 percent by weight of one or more other copolymerizable vinyl esters of non-tertiary alkanoic acid, and (3) from about 20 percent to about 65 percent by weight of one or more alkyl acrylates having 4 to 14 carbon atoms in the alkyl group.

8. The composition of claim 7 in which said liquid aliphatic hydrocarbon is n-hexane, n-heptane or a mixture thereof.

9. The composition of claim 7 in which said vinyl ester of a tertiary alkanoic acid is a mixture of compounds of the formula

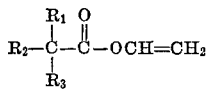

where $R_1$, $R_2$ and $R_3$ are alkyl groups having a total average number of about 7 to 8 carbon atoms.

10. The composition of claim 7 in which said copolymerizable vinyl ester is vinyl acetate and said alkyl acrylate is 2-ethylhexyl acrylate.

References Cited

UNITED STATES PATENTS

| | | | |
|---|---|---|---|
| 3,355,412 | 11/1967 | Hart et al. | 260—32.8 |
| 3,446,767 | 5/1969 | Nolan | 260—80.81 |

FOREIGN PATENTS

| | | | |
|---|---|---|---|
| 1,471,882 | 3/1967 | France | 260—80.81 |

OTHER REFERENCES

Tess et al.—Amer. Chem. Soc., Div. Org. Coatings Plastics Chem., preprints 26 (2), 276–291 (1966).

MORRIS LIEBMAN, Primary Examiner

H. H. FLETCHER, Assistant Examiner

U.S. Cl. X.R.

260—80.8, 80.81, 86.1 E